US010325324B2

United States Patent
Fu et al.

(10) Patent No.: US 10,325,324 B2
(45) Date of Patent: Jun. 18, 2019

(54) SOCIAL CONTEXT FOR OFFSITE ADVERTISEMENTS

(75) Inventors: Wenjie Fu, Foster City, CA (US); Alon Amit, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 1289 days.

(21) Appl. No.: 13/597,103

(22) Filed: Aug. 28, 2012

(65) Prior Publication Data
US 2014/0067545 A1    Mar. 6, 2014

(51) Int. Cl.
*G06Q 30/02* (2012.01)
*G06Q 50/00* (2012.01)

(52) U.S. Cl.
CPC ......... *G06Q 50/01* (2013.01); *G06Q 30/0269* (2013.01)

(58) Field of Classification Search
None
See application file for complete search history.

(56) References Cited

U.S. PATENT DOCUMENTS

| | | | | |
|---|---|---|---|---|
| 8,504,910 | B2 * | 8/2013 | Tarjan | G06F 17/2247 715/234 |
| 2005/0267872 | A1 * | 12/2005 | Galai | G06F 16/35 |
| 2006/0020510 | A1 * | 1/2006 | Vest | G06Q 30/02 705/14.52 |
| 2007/0038516 | A1 * | 2/2007 | Apple | G06O 30/02 705/14.42 |
| 2007/0168336 | A1 * | 7/2007 | Ransil | G06F 16/958 |
| 2007/0198506 | A1 * | 8/2007 | Attaran Rezaei | G06F 21/6218 |
| 2008/0275783 | A1 * | 11/2008 | Wee | G06O 30/02 705/14.54 |
| 2008/0275899 | A1 * | 11/2008 | Baluja | G06Q 30/02 |
| 2009/0182589 | A1 * | 7/2009 | Kendall | G06Q 10/02 705/5 |
| 2010/0185507 | A1 * | 7/2010 | Tokuda | G06Q 30/02 705/14.41 |
| 2011/0016533 | A1 * | 1/2011 | Zeigler | G06Q 30/00 726/26 |
| 2011/0035345 | A1 * | 2/2011 | Duan | G06K 9/6256 706/12 |
| 2011/0153377 | A1 * | 6/2011 | Novikov | G06Q 10/063 705/7.11 |

(Continued)

OTHER PUBLICATIONS

PCT International Search Report and Written Opinion, PCT Application No. PCT/US2013/052146, dated Nov. 12, 2013, eleven pages.

*Primary Examiner* — John Van Bramer
(74) *Attorney, Agent, or Firm* — Fenwick & West LLP

(57) ABSTRACT

A social networking system associates one or more objects in the social networking system with a link to content external to the social networking system. This allows information about the object to be used as a proxy for information about the external content. An index associating objects in the social networking system with links to content external to the social networking system is maintained. A received link to external content are parsed into components, such as a domain name, a path, and a query string, and the components are compared to the index to identify an object associated with one or more of the comments of the received link. One or more rules may be applied to increase the likelihood of the identified object having similar subject matter as the external content.

15 Claims, 4 Drawing Sheets

(56) References Cited

U.S. PATENT DOCUMENTS

2011/0258050 A1* 10/2011 Chan .................... G06Q 30/02
                                                    705/14.66
2011/0307312 A1* 12/2011 Goeldi .................. G06Q 10/00
                                                    705/14.6

* cited by examiner

| Social Networking Object | Domain Name | Path | Query String |
|---|---|---|---|
| Marketplace | Market.com | | |
| Marketplace | Market.com | /books | |
| Author | Market.com | /books | |
| Publisher | Market.com | /books | |
| Author | Market.com | /books | /book?a3iojk |
| Publisher | Market.com | /books | /book?b78fdr |
| Author | Author.com | | |
| ... | ... | | |

300 — Marketplace row (second)
301 — Author row

FIG. 3

Advertisement
400

"Buy books!"

<Market.com/books/>

FIG. 4A

Advertisement
401

"Buy my book!"

<Market.com/books/book?a3iojk>

FIG. 4B

SOCIAL CONTEXT FOR OFFSITE ADVERTISEMENTS

BACKGROUND

This invention relates generally to social networking and, more specifically, to adding social context to advertisements pointing outside of a social networking system.

Social networking systems maintain information about users in a social graph, which may include edges and nodes representing interactions and connections between objects in the social networking system. Hence, the social graph allows the social networking system to build relationships between objects, such as users. Based on these relationships, affinities between the users and social networking objects may be determined and used to identify content for presentation to users. For example, affinities may be used to select advertisements for presentation to a user.

However, some advertisements link to content external to the social networking system, such as pages hosted by a website in a domain outside of the social networking system. This external content may not be associated with an object in the social networking system, preventing the social networking system from determining social context or affinities for the external content. Without social context or affinity for the external content, the social networking system is unable to effectively target presentation of the external content to social networking system users likely to be interested in the external content.

SUMMARY

A social networking system generates and stores an index associating objects in the social networking system (e.g., pages, applications, etc.) with links to content external to the social networking system. This allows the social networking system to associate external content with one or more objects maintained by the social networking system. Associating external content with an object allows the social networking system may use information about the object, such as users' affinities for the object or other social context information, to determine how to present the external content to social networking system users. To accurately associate external content with an object, the social networking system identifies components of a link to the external content and associates the link components with an object. For example, the link to external content is parsed into a domain, a path and a query string and a page in the social networking system is associated with the grouping of domain, path and query string in the index.

When an advertisement including an advertisement link to external content is received, the social networking system accesses the index to identify an object in the social networking system associated with the advertisement link. This allows use of affinity for the object and/or other social content information about the object when identifying users to be presented the advertisement. The advertisement link to external content is parsed into a plurality of components, such as a domain, a path and a query string. Using the components of the link to external content, one or more candidate objects are retrieved from the index. The candidate objects are associated with at least one component that matches a component of the link to external content. For example, a candidate object is associated with a domain, path and/or query string matching the domain, path and/or query string of the link to external content.

An object is selected from the candidate objects based on characteristics of the candidate objects and/or characteristics of the links to external content associated with the candidate objects. In one embodiment, one or more rules are applied to the candidate objects and/or to the links to external content associated with the candidate objects to select an object. For example, a number of social networking system users connected to each candidate object is determined and the object connected to the highest number of social networking system users or the object having the most of a specified type of connection to other social networking system users is selected. As another example, one or more components of a link to external content associated with a selected object are compared to attributes of the selected object to verify a relationship between the selected object and its associated link to external content. For example, a domain from the link to external content is compared to a title of a selected page to increase the likelihood that the link to external content is associated with the page. The social networking system associates the selected object with the advertisement, allowing social context maintained for the selected object to be associated with the advertisement and used to modify presentation of the advertisement. Additionally, subsequent interactions with the advertisement may be associated with the selected object, allowing the social networking system to use the selected object as a proxy for determining social context for the advertisement.

BRIEF DESCRIPTION OF THE DRAWINGS

FIG. 3 illustrates a portion of an example social context index associating social networking objects with links to external content in accordance with an embodiment.

FIGS. 4A and 4B are examples of advertisements including external links in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
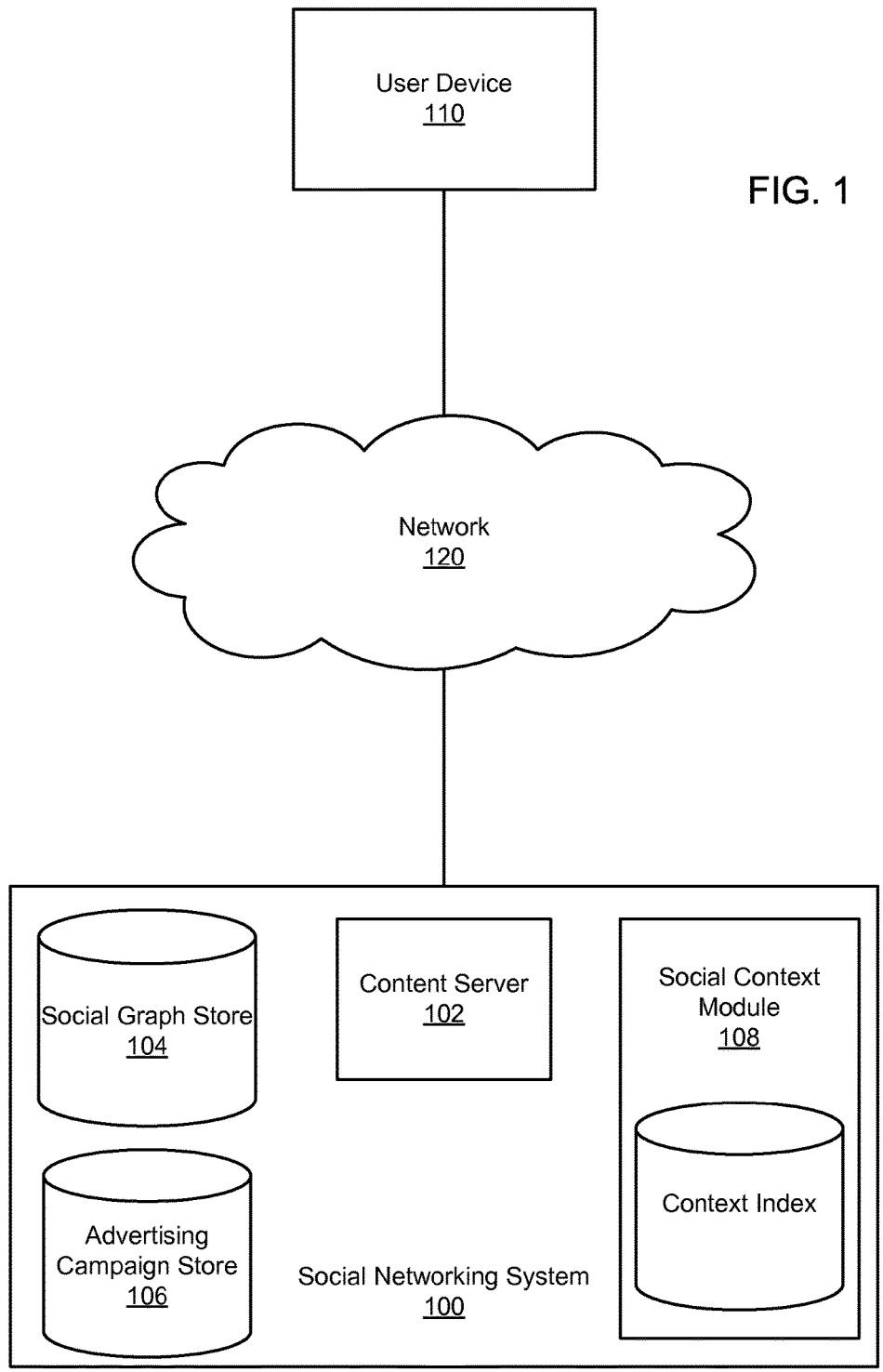
FIG. 1 is a block diagram of one embodiment of a system environment including a social networking system in accordance with an embodiment.

FIG. 1 is a block diagram of one embodiment of a system environment including a social networking system 100. The social networking system 100 communicates with a user device 110 through a network 120. The network 120 may include wireless networks, wired networks, or a combination of network types, and provides a channel for communications between the user device 110 and the social networking system 100, which may be exchanged using any suitable communication protocol or combination of protocols.

While FIG. 1 shows a single user device 110, in practice a plurality of user devices 110 communicate with the social networking system 100. A user of the user device 110 is associated with a user profile maintained by the social networking system 100, allowing the user to form connections to other users of the social networking system 100 and to objects maintained by the social networking system. Using the user profile, the social networking system 100 selects social networking content for presentation to the user. The social networking system 100 may also use the user profile to select advertisements for presentation to the user. An advertisement selected for the user may include a link to an object stored by the social networking system 100 ("an internal link") or may include a link to content external to the social networking system 100, such as content from a domain outside of the social networking system 100 ("an external link"). An external link is typically a uniform resource locator (URL) or other suitable reference to a resource accessible via the network 120.

In one embodiment, the social networking system 100 includes a content server 102, a social graph store 104, and an advertising campaign store 106. The social graph store 104 stores user profiles describing characteristics of social networking system users and other objects maintained by the social networking system 100. Examples of objects included in the social graph store 104 include applications, events, groups, pages associated with businesses, organizations or other entities or other suitable data. The social graph store 104 also stores connections between social networking system users and other users and/or objects included in the social graph store 104. The content server 102 selects content provided to users by the social networking system ("social networking content") based on data in the social graph store 104. Content selected by the content server 102 is communicated to a user device 110 for presentation to a user.

To tailor content and other information to a user's interests, the social graph store 104 or the content server 102 maintains information about the user's interactions with other users and objects in the social graph store 104. Example user interactions include: a user viewing an object, accessing an object, posting a comment on a photo, posting content to a page and other suitable type of interactions with social networking objects. The user interactions may be used by the social networking system 100 for various purposes. For example, the content server 102 determines a user's affinities for various objects based on the user's interaction with the objects and uses the determined affinities to select content for presentation to the user.

The social context module 108 determines the social context for advertisements. The social context is an association in the social networking system 100 between for an item or object (e.g. a website) that is not currently represented in the social networking system 100 and a social networking object. Typically, the social context is a particular social networking object associated with a topic or a keyword that most closely relates to the context of the advertisement including the item or object external to the social networking system 100. The social networking object is used, for example, to select social networking content to present with the item or object external to the social networking system 100.

The social networking system 100 may also determine a generalized social context for social networking objects. This generalized social context identifies a concept common to a plurality of social networking system objects. For example, several social networking objects may refer to the same movie, such as a page created for the movie by a movie studio, a review of the movie, and a comment describing the movie. Each of these social networking objects relates to the same concept of the movie. Social context and uses for a social context are further described in U.S. application Ser. Nos. 13/295,002, filed Nov. 11, 2011, and 13/043,424, filed Mar. 8, 2011, which are incorporated by reference in their entirety.

For advertisements including an internal link, an object in the social graph store 104 is identified by the internal link, so the social context of the advertisement may be determined to be the object identified by the internal link. For advertisements including an external link, the social context module 108 accesses a context index to determine the social context of the link to external content. The index allows the social context module 108 to identify objects in the social graph store 104 associated with the link to external content, allowing information about the objects in the social graph to provide the social context of the link to external content.

The context index maintained by the social context module 108 associates objects in the social graph store 104 with links to content external to the social networking system 100. For example, the content index associates an object in the social graph store 104 with a uniform resource locator (URL) to content external to the social networking system 100. Associations between objects in the social graph store 104 and external links may be user specified or may be determined by analyzing content objects in the social graph store 104 and links to external content. For example, a marketplace may maintain a social networking object that links to the marketplace's external webpage, marketplace.com, so the content index includes an association between marketplace.com and the marketplace's social networking object. A social networking object, such as a page or an application, may include one or more links to content external to the social networking system 100, and the content index associates the links to external content with the page or application including them. The content index may associate more than one social networking object with a link to external content. For example, both a marketplace and an author of a book sold by the marketplace may link to the marketplace's external link.

In one embodiment, the links may also be normalized prior to inclusion in the context index to provide consistency across various links. The social context module 108 may identify specific delimiter characters within a link and removes portions of the link having positions relative to a delimiter character. For example, the social context module 108 identifies a "#" or "!" in the link and removes characters after the "#" or "!" in the link. This normalization removes extraneous data from the link while preserving components of the link with information for After normalization, components of each external link are extracted from the links to external content and used to order the content index. In one embodiment, the social context module 108 extracts a domain name, a path and a query string from links to external content. The path may be a portion of a URL identifying a specific page maintained by a domain name while the query string is a portion of the URL specifying information to the identified page. For example, in an external link URL of "www.marketplace.com/books/booklist.html?abcde" the social context module 108 identifies "www.marketplace.com" as the domain name, "books/booklist.html" as the path, and "?abcde" as the query string. External links may include a subset of the components, such as having a domain name but not a path or query string. The content index associates the components of the external links with social networking objects, and may be ordered based on a component. For example, the content index may be ordered according to a hierarchy associated with the components, such as ordering based on domain name, then based on path then based on query string.

To identify the social context for an advertisement including an external link, the social context module 108 parses the external link into components and identifies a social object from the context index using the components of the external link. For example, the social context module 108 identifies candidate social networking objects associated with links to external content having one or more components matching components of the external link from the advertisement from the context index. As described below in conjunction with FIG. 5, the social context module 108 may apply one or more rules to the candidate social networking objects to select a social networking object associated with the external link in the advertisement.

Social Graph

Figure 2:
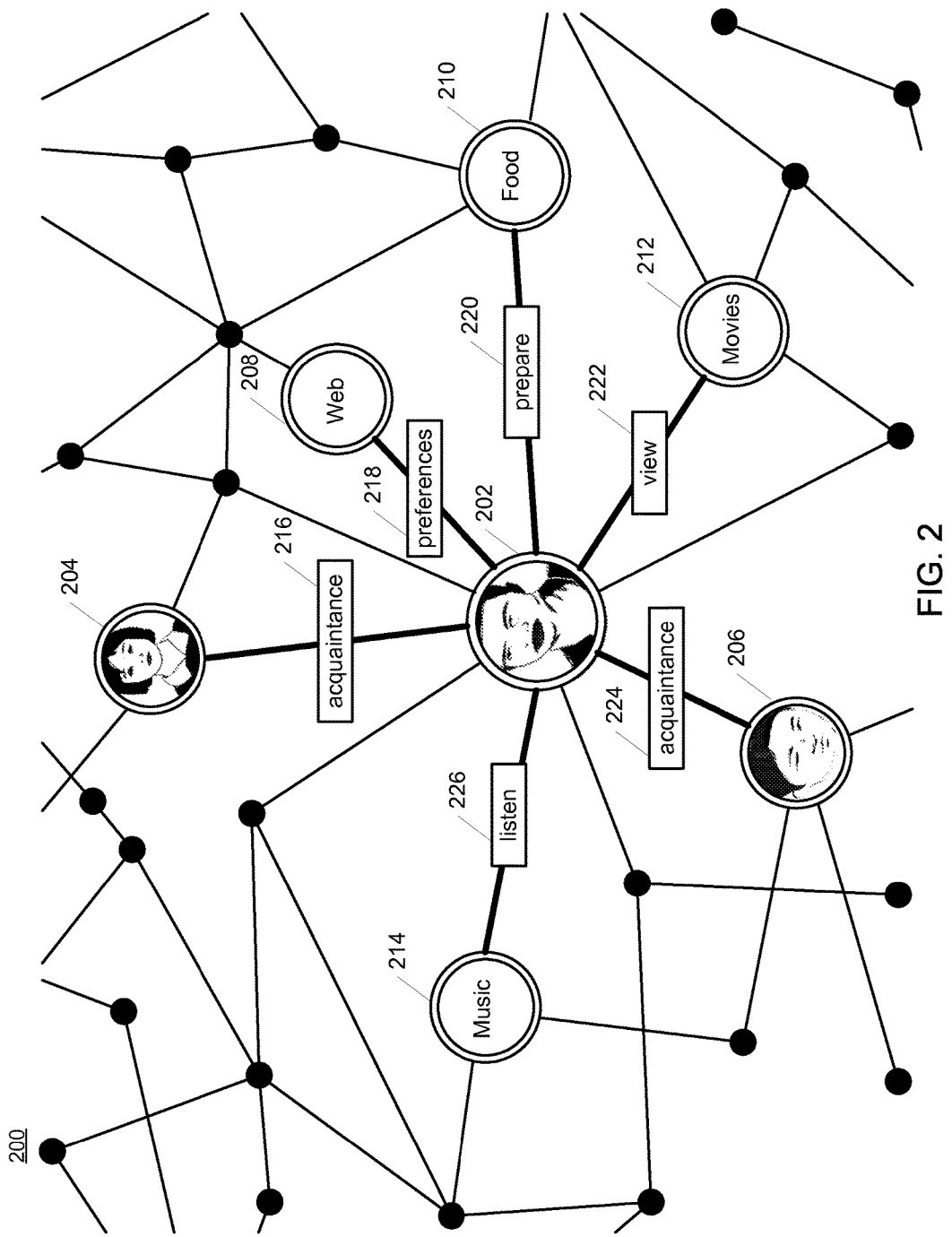
FIG. 2 illustrates an example social graph in accordance with an embodiment.

FIG. 2 illustrates an example social graph 200 includes multiple nodes 202, 204, 206, 208, 210, 212, and 214, representing a variety of social networking system objects that can act on and/or be acted upon by another node. In FIG. 2, the nodes 202, 204, and 206 represent user objects. The node 208 represents a page object associated with an external website, while the node 210 represents a recipe object from a cooking application. Also, the node 212 represents a video object (e.g., a movie) from a video streaming application, and the node 214 represents a song object from a music streaming application.

An edge between nodes in the social graph 200 represents a connection between the nodes, which may have a particular connection type. For example, an edge 216 between the node 202 and the node 204 has a connection type of "acquaintance" to show the relationship between the users corresponding to the node 202 and the node 204; similarly, an edge 216 between the node 202 and the node 206 also has an "acquaintance" type to show a relationship between users corresponding to the node 202 and the node 206. In another example, an edge 218 having a "preference" connection type connects the node 202 with the node 208 to illustrate that the user corresponding to the node 202 "likes" or prefers the page object corresponding to the node 208.

Connections, represented by edges, may be created from an action performed by a node on another node. For example, the user represented by the node 202 performs an action "prepare" the recipe associated with the object corresponding to the node 210, so an edge 220 having a "prepare" connection type is created between the node 202 and the node 210. Similarly, the user represented by the node 202 performs an action of "listen" for the song associated with node 214, causing an edge 226 with a connection type of "listen" to be crated between the node 202 and the node 214. In FIG. 2, the user corresponding to the node 202 also performs a "view" action on the movie corresponding to the node 212, so an edge 222 with a "view" connection type is created between the node 202 and the node 212. Examples of other actions include listing social networking system objects in a user profile, subscribing to or joining a social networking system group or fan page, sending a message to another social networking system user, making a purchase associated with a social networking system object, commenting on a content item, or responding to an invitation to an event. Hence, the social graph 200 allows the social networking system 100 to represent objects in the social networking system 100 as well as relationships or associations between the objects.

Social Context Index

FIG. 3 illustrates a portion of an example social context index associating social networking objects with links to external content. The social networking objects in the example of FIG. 3 include a marketplace, an author, and a publisher. In this example, the marketplace social networking object is a social networking object associated with a marketplace having a website of market.com, the author object is a social networking object associated with an author, and the publisher object is a social networking object associated with a publisher.

In this example, the marketplace page object is associated with an external link for market.com and an external link for market.com/books/. The author object is associated with the external link for market.com/books/ and is also associated with an external link for market.com/books/book?a3iojk and an external link for a website maintained by the author, author.com. The publisher object is also associated with market.com/books/ and the publisher object is associated with an external link for market.com/books/book?b78fdr. The social context module 108 analyzes these external links to identify components of the external link. In the example of FIG. 3, the components of the external link are a domain name, a path, and a query string. The social context module 108 creates a context index using the components identified for each external link and associating each link to the social networking object as an entry in the context index. The social context index is also sorted, or ordered, based on the domain name, the path, and the query string. In FIG. 3, the first entry in the social context index is the marketplace object, which is associated with the domain name "market.com." The following entries are associated with "marketplace.com/books" that indicates a path of "/books" and the domain name "marketplace.com" is associated with the marketplace object, the author object, and the publisher object. An entry indicating a query string of "/book?a3iojk," a path of "/books" and a domain name of "market.com" is associated with the author object. Likewise an entry indicates a query string of "/book?b78fdr," a path of "/books," and a domain of "market.com" is associated with the publisher object. Finally an entry associates the author object with the domain name of "author.com." As shown in FIG. 3, one external link may be associated with multiple social networking objects in the social context index. Hence, each social networking object may be associated with several external links, which may also be associated with other social networking objects.

FIGS. 4A and 4B are example advertisements 400 and 401 including external links. The advertisement 400 includes text "Buy books!" and an external link to market.com/books, while the advertisement 401 includes text "Buy my book!" and an external link to market.com/books/book?a3iojk. Though both advertisements 400, 401 include a link to content maintained in the market.com domain, each advertisement 400, 401 has different content and may be best associated with different social contexts. The advertisement 400 has content relating to generally purchasing books from market.com. However, the advertisement 401 has content relating to purchasing a specific book from a particular author. The social context module 108 determines what social context, if any, to associate with the advertisements 400 and 401.

Figure 5:
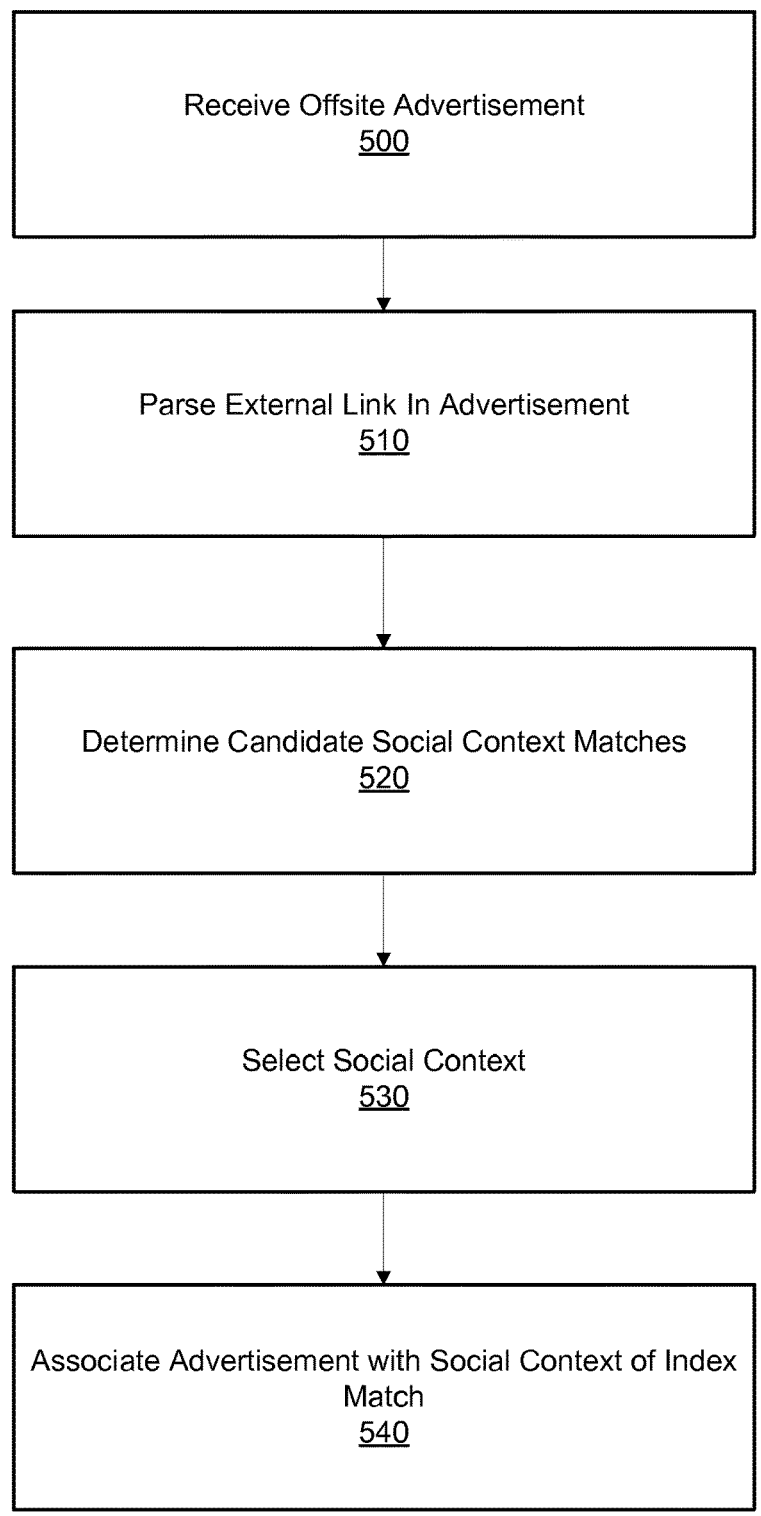
FIG. 5 illustrates a method for determining a social networking object for association with an advertisement according to an embodiment.

FIG. 5 illustrates one embodiment of a method for determining a social networking object to associate with an advertisement. This method may be performed by the social context module 108. An offsite advertisement including a link to content external to the social networking system 100 ("an external link") is received 500 by the social context module 108, which parses 510 the external link in the advertisement into a plurality of components. For example, the social context module 108 parses 510 the external link in the advertisement into a domain name, a path, and a query string. The components of the external link are used to access the social context index to determine 520 candidate social contexts for the advertisement.

To determine 520 candidate social context matches, the social context module 108 uses the components of the advertiser's link to determine whether the social context index includes a link to external content exactly matching the advertisement's link to external content. For links to external content in the social context index having components matching the components of the advertisement's link to external content, the social networking object associated with the link to external content in the social context index is selected as a candidate social context match. Referring to FIGS. 3 and 4A, the link to external content in the advertisement 400, market.com/books, is matched by three entries in the social context index, the marketplace object, the author object, and the publisher object. Each of these social networking objects is selected as candidate contexts. Referring to FIGS. 3 and 4B, the link to external content in advertisement 401 is matched by one entry in the social context index, the author object.

In the examples of advertisements 400 and 401, the social context index includes an exact match for the link to external content in the advertisement. When the social context index does not include an exact match, the social context module 108 may apply one or more rules to select a set of one or more candidate social networking system objects to associate with the link to external content. In one embodiment, the social context module 108 identifies links to external content in the social context index having components matching one or more components of the advertisement's link to external content. For example, the social context module 108 determines whether links to external content have a domain name, a path or a query string matching a domain name, a path or a query string of the advertisement's link to external content. If no link to external content has a component matching a component of the advertisement's link to external content, the social context module 108 does not select any candidate social networking objects or associate the advertisement's link to external content with a social networking object.

If one or more components of a link to external content in the social context index match one or more components of the advertisement's link to external content, the social context module 108 analyzes the matching components to determine candidate social networking objects. For example, when a domain name of a link to external content in the social context index matches a domain name of the advertisement's link to external content, the social context module 108 determines whether a path of the link to external content having the matching domain name matches a path of the advertisement's link to external content. If the link to external content having the matching domain name does not include a path, the social context module 108 determines whether a link to external content in the social context index has a path and domain name matching the advertisement's link to external content. If no paths are identified in the social context index, the social networking objects associated with the matching domain name are selected as candidate social networking objects.

If a link to external content in the social context index includes a domain name that matches the domain name of the advertisement's link to external content but also includes a path that does not match the path of the advertisement's link to external content, the social context module 108 determines a domain size for the domain name. In one embodiment, the domain size is based on the number of social networking objects associated with the domain name in the social context index. A large domain is a domain name associated with at least a threshold number of social networking objects in the social context index, while a small domain is a domain name associated with less than the threshold number of social networking objects. For example, a large domain is a domain name associated with five or more social networking objects in the social context index. If the domain size indicates a large domain, each path is likely to point to distinct items so link(s) in the social context index including a domain name matching the domain name of the advertisement's link to external content and including a path that does not match the path of the advertisement's link to external content is not selected. If the domain size indicates a small domain, it is likely that the domain name does not provide a variety of content so general interactions with the domain name may fairly represent interest in the domain name as a whole. Hence, for a small domain, a social networking object associated with a domain name matching the domain name of the advertisement's link to external content but associated with a path that does not match the path of the advertisement's link to external content may be selected. For a large domain, no social networking objects may be selected. For example, a link may specifically identify a news story published on a news website external to the social networking system and including multiple news stories, so interaction with that external link may not be representative of interest in the news website as a whole.

However, if multiple links to external content in the social context index have components matching components of the advertisement's link to external content, social networking objects associated with the links to external content in the social context index are selected as candidate social networking objects and the social context module 108 applies one or more rules to the candidate social networking objects to identify a social networking object to associate with the advertisement's link to external content. For example, referring to FIGS. 3 and 4A, the link to external content in the advertisement 400, "market.com/books/" is associated with both the business page object 300 and the author object 301. Hence, the social context module applies one or more rules to the business page object 300 and the author object 301 to select one for association with the advertisement's link to external content.

If the advertiser's link matches the domain name and path of a link in the social context index but does not match a query string of the link, the social context module 108 determines whether to select social networking objects based on the domain name and path of links associated with the social networking objects by the social context index. In one embodiment, the social context module 108 determines whether the social context index includes entries including a matching domain name, a matching path and query strings. If the social context index does not include entries with query strings as well as a matching domain name and a matching path, social networking objects matching the domain name and the path are selected as the candidate social networking objects. If the social context index includes entries having a query string as well a matching domain name and a matching path, the social context module 108 does not select any candidate social networking objects because the query strings are likely to identify unique pieces of content external to the social networking system 100. However, for a matching domain and path having at most a threshold number of query strings associated with a matching domain name and a matching path in the social context index, the social networking system may select candidate social networking objects associated with the matching domain name and the matching path.

In one embodiment, the owner of a domain name may include the domain name on a whitelist designating that any link to the domain name is considered for association with a social networking object specified by the whitelist. In the example of FIGS. 3 and 4, the owner of the marketplace object may designate any link to the domain "market.com" be associated with the marketplace object. In one embodiment, an external link including a domain name specified by the whitelist is automatically associated with the social networking object designated by the whitelist.

In one embodiment, the social context module 108 verifies the accuracy of an association between a social networking object with a link to external content. Associations between a social networking object and a link to external content that cannot be verified are excluded from selection as the social networking object associated with the link to external content. In one embodiment, the social context module 108 compares components of the link to external content with attributes of the social networking object to verify an association between the social networking object and the link to external content. For example, the title of the social networking object is compared to one or more of the domain name, path, and query string of the link to external content. If none of the components of the link to external content match the title of the social networking object, the social context module 108 excludes the social networking object from being used to represent the social context of the link to external content. For example, a social networking object titled "puppies-and-kitties" may be excluded from representing the social context of an external link of "walrus.com/waving-walrus.jpg" because no component of "walrus.com/waving-walrus.jpg" matches the social networking object title. In one embodiment, the social context module 108 may use a list of associated words or related tuples to identify whether terms in a link to external content match terms in a social networking object.

Based on the candidate social networking objects, the social context module 108 selects 530 a social networking object and associates 540 the selected social networking object with the link to external content in the advertisement, and consequently associates 540 the selected social networking object with the advertisement. To select 520 the social networking object, the social context module 108 accesses the social graph store 104 for information about the various candidate social networking objects. For example, the social context module 108 determines the popularity of each of the candidate social networking objects and selects the candidate social networking object having the highest popularity. The popularity may be measured by the affinities for the candidate objects by various social networking system users, by the number of users connected to each candidate object, by the number of connections to each candidate social networking object having a specified type (e.g., number of likes of a candidate social networking object, number of fans of a candidate social networking object, subscriptions of users to the candidate social networking object, etc.). The most popular candidate social networking object is selected 530 as the social networking object associated with the link to external content. In one embodiment, more than one candidate social networking object may be selected with the advertisement's link to external content. In one embodiment, the social networking object associated 540 with an advertisement is reassessed from time to time to account for changes in the popularity of social networking objects and the content of external pages. To simplify reassessment of the social networking object associated with an advertisement, a timestamp indicating when the association between social networking object and advertisement was made may be included in the social networking object.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing an index associating objects maintained by a social networking system with links to content external to the social networking system, the index organized based on components of the links to content external to the social networking system;
receiving an advertisement including an advertisement link to content external to the social networking system and targeting criteria;
parsing the advertisement link into a plurality of components;
retrieving one or more candidate objects from the index, each candidate object having at least one component of a link to content external to the social networking system matching a component of the advertisement link;
selecting, by a processor, an object from the candidate objects based on at least one of: characteristics of the candidate objects and characteristics of the links to external content associated with the candidate objects;
associating the selected object with the advertisement;
identifying a user of the social networking system to be provided the advertisement, the user being identified based at least in part on the targeting criteria;
identifying a social context for the advertisement based on the selected object and interactions between an additional user associated with the identified user and the selected object;
augmenting the advertisement with the identified social context; and
providing the augmented advertisement to a user device for presentation to the identified user.

2. The method of claim 1, wherein the components of the links to content external to the social networking system stored in the index comprise a domain name, a path, and a query string.

3. The method of claim 2, further comprising:
determining whether the advertisement link is a link to a large domain or a link to a small domain, and retrieving the candidate objects based at least in part on whether the advertisement link is a link to a large domain or a link to a small domain.

4. The method of claim 3, wherein determining whether the advertisement link is a link to small domain comprises:
determining whether the index associates at least a threshold number of objects with components of the advertisement link;
responsive to determining that the index associates at least a threshold number of objects with the components of the advertisement link, determining that the advertisement link is a link to a large domain; and
responsive to determining that the index associates less than the threshold number of objects with the components of the advertisement link, determining that the advertisement link is a link to a small domain.

5. The method of claim 4, wherein retrieving one or more candidate objects from the index comprises:
responsive to determining that the advertisement link is a link to a small domain, retrieving candidate objects associated with a link to content external to the social networking system having a reduced number of components matching components of the advertisement link; and
responsive to determining that the advertisement link is a link to a large domain, retrieving candidate objects associated with a link to content external to the social networking system having an increased number of components matching components of the advertisement link.

6. The method of claim 2, wherein the domain name components in the external links of the retrieved candidate objects match the domain name component of the advertisement link.

7. The method of claim 6, wherein the path components in the external links of the retrieved candidate objects match the path component of the advertisement link.

8. The method of claim 6, wherein the paths of the external links associated with the retrieved candidate objects do not match the path of the advertisement link when the index does not contain any objects that are associated with an external link matching the domain and path of the advertisement link.

9. The method of claim 1, wherein the characteristics of the candidate objects comprise at least one of likes, fans, and subscribers; and further wherein the selected object from the candidate objects is the candidate object with a most of one of likes, fans, or subscribers.

10. The method of claim 1, wherein selecting the object from the candidate objects based on at least one of: characteristics of the candidate objects and characteristics of the links to external content associated with the candidate objects comprises:
comparing one or more components of a link to external content associated with the selected object to an attribute of the selected object; and
responsive to the attribute of the selected object not matching at least one component of the link to external content associated with the selected object, disregarding the selected object.

11. The method of claim 10, wherein the attribute of the selected object is a title of the selected object.

12. A method comprising:
retrieving a plurality of objects maintained by a social networking system, each object associated with at least one object link to content external to the social networking system;
parsing each of the object links into one or more components, each component corresponding to a portion of an address hierarchy of an object link;
storing the object links in a content index associating an object link with one or more objects, the content index including entries organized based on components of an object link included in an entry;
receiving an advertisement including an advertisement link to content external to the social networking system and targeting criteria;
parsing the advertisement link into one or more components;
retrieving one or more candidate objects from the index, each candidate object associated with at least one component of an object link matching at least one component of the advertisement link;
selecting, by a processor, an object from the one or more candidate objects based on components of the advertisement link, components of the object links associated with each of the one or more candidate objects, and characteristics of each of the candidate objects;
associating the selected object with the advertisement;
identifying a user of the social networking system to be provided the advertisement, the user being identified based at least in part on the targeting criteria;

identifying a social context for the advertisement based on the selected object and interactions between an additional user associated with the identified user and the selected object;

augmenting the advertisement with the identified social context; and providing the augmented advertisement to a user device for presentation to the identified user.

13. The method of claim 12, wherein the selected social networking object from the one or more candidate objects is based in part on a popularity associated with each of the one or more candidate objects.

14. The method of claim 12, wherein selecting the social networking object from the one or more candidate objects based on components of the advertisement link, components of the object links associated with each of the one or more candidate objects, and characteristics of each of the candidate objects comprises:

selecting the social networking object based on a number of components of the advertisement link matching components of an object link associated with the social networking object.

15. The method of claim 12, wherein a social networking object from the one or more candidate objects is not selected if the characteristics of the object link associated with the social networking object do not match any components of the advertising link.

* * * * *